United States Patent [19]
Kobayashi et al.

[11] Patent Number: 4,879,360
[45] Date of Patent: Nov. 7, 1989

[54] POLYPHENYLENE ETHER RESIN COMPOSITION

[75] Inventors: Yoshinobu Kobayashi; Tosio Itou; Takayuki Inoue, all of Mie, Japan

[73] Assignee: Mitsubishi Petrochemical Co., Ltd., Tokyo, Japan

[21] Appl. No.: 167,238

[22] Filed: Mar. 11, 1988

[30] Foreign Application Priority Data

Mar. 13, 1987 [JP] Japan ................... 62-58561

[51] Int. Cl.$^4$ .................... C08G 65/48; C08L 63/08; C08L 71/04
[52] U.S. Cl. .................... 525/396; 525/397; 525/905
[58] Field of Search ................ 525/396, 905

[56] References Cited

U.S. PATENT DOCUMENTS 3,383,435  5/1968  Cizex .
4,234,701 11/1980  Abolins et al. ............ 525/77
4,614,773  9/1986  Sugio et al. .

FOREIGN PATENT DOCUMENTS 196594   6/1983  Japan ................... 525/396
8700850  2/1987  World Int. Prop. O. .

OTHER PUBLICATIONS

Patent Abstracts of Japan, vol. 11, No. 349, (C-456) [2796] Nov. 14th, 1987 & JP; Toray Ind. Inc.

Primary Examiner—Jacob Ziegler
Attorney, Agent, or Firm—Oblon, Spivak, McClelland, Maier & Neustadt

[57] ABSTRACT

A polyphenylene ether resin composition comprising (a) a polyphenylene ether resin, (b) a polyester resin, and (c) from 0.1 to 10 parts by weight, per 100 parts by weight of the total of the components (a) and (b), an epoxidized liquid polybutadiene having an oxirane oxygen content of at least 0.07% by weight. The composition is excellent in solvent resistance and mechanical strength.

11 Claims, No Drawings

POLYPHENYLENE ETHER RESIN COMPOSITION

FIELD OF THE INVENTION

This invention relates to a polyphenylene ether resin composition excellent in solvent resistance and mechanical strength. More particularly, it relates to a polyphenylene ether resin composition comprising a polyphenylene ether resin, a polyester resin, and a specific amount of epoxidized liquid polybutadiene having a specific oxirane oxygen content.

BACKGROUND OF THE INVENTION

A polyphenylene ether resin is a useful high polymeric material as engineering plastic because of its heat resistance, mechanical strength, and electrical characteristics. However, a polyphenylene ether resin is known to be inferior in solvent resistance, oil resistance, and molding properties as is common to noncrystalline resins.

In an attempt to compensate for poor molding properties of polyphenylene ether resin, it has been proposed to blend a polystyrene resin as disclosed in U.S. Pat. No. 3,383,435. This technique, however, does not bring about improvement on solvent resistance and oil resistance of polyphenylene ether resin.

It has also been proposed to compound a polyester resin into a polyphenylene ether resin thereby to improve molding properties, i.e., fluidity, of the polyphenylene ether resin as disclosed in Japanese Patent Publication No. 21664/76. As a result of studies, the present inventors have confirmed improvement of fluidity brought about by compounding the polyester resin. However, it has been turned out that compounding of the polyester resin in a proportion exceeding 20% by weight of the resulting composition results in great impairment of mechanical strength inherently possessed by the polyphenylene ether resin. This is considered ascribed to essential incompatibility between the polyphenylene ether resin and the polyester resin to cause significant phase separation as the amount of the polyester resin increases. In fact, the above-cited publication describes that the polymer blend of polyphenylene ether resin and polyester resin is "opaque" and has "a pearl-like tone", implying that the two resin components are not finely blended but nonuniformly dispersed involving phase separation.

Further, a polyester resin, when compounded into a polyphenylene ether resin, improves solvent resistance of the polyphenylene ether resin to an extent proportional to the amount compounded. Therefore, achievement of sufficient solvent resistance requires compounding of a large quantity of the polyester resin. As mentioned above, such compounding only produces a resin composition having reduced mechanical strength due to non-uniformity and phase separation.

In order to eliminate these disadvantages, it is necessary to improve compatibility between a polyphenylene ether resin and a polyester resin. To this effect, it has been suggested to incorporate a specific resin (phenoxy resin) into a composition of the polyphenylene ether resin and the polyester resin as disclosed in U.S. Pat. No. 4,614,773. According to this technique, the resulting composition has improved tensile strength but is found to have insufficient impact resistance, which would limit the use of the composition in the field requiring impact resistance, such as automobile exterior parts.

SUMMARY OF THE INVENTION

One object of this invention is to provide a polyphenylene ether resin composition comprising a polyphenylene ether resin and a polyester resin, which is excellent in mechanical strength, oil resistance, and molding properties.

As described above, since a polyphenylene ether resin and a polyester resin show essential incompatibility, mere melt-kneading of them finds difficulty in uniformly dispersing only to provide a resin composition having poor mechanical strength, and particularly impact strength.

The inventors have conducted investigations to develop a method of improving dispersibility (compatibility) of a polyphenylene ether resin and a polyester resin to prevent phase separation. As a result, it has now been found that the above object of the present invention can be accomplished by adding to the resin composition of a polyphenylene ether resin and a polyester resin an epoxidized liquid polybutadiene having a specific oxirane oxygen content.

The present invention relates to a polyphenylene ether resin composition comprising (a) a polyphenylene ether resin, (b) a polyester resin, and (c) from 0.1 to 10 parts by weight, per 100 parts by weight of the total amount of the components (a) and (b), of an epoxidized liquid polybutadiene having an oxirane oxygen content of at least 0.07% by weight.

DETAILED DESCRIPTION OF THE INVENTION

The polyphenylene ether resin which can be used as component (a) in the present invention includes polyphenylene ether resins obtained by polycondensation of one or more monocyclic phenols represented by formula (I):

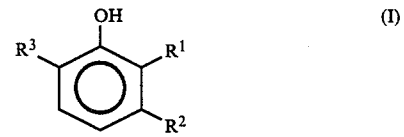

wherein $R^1$ represents a lower alkyl group having from 1 to 3 carbon atoms; $R^2$ and $R^3$ each represents a hydrogen atom or a lower alkyl group having from 1 to 3 carbon atoms; and at least one of the ortho-positions with respect to the hydroxyl group should have a lower alkyl group.

The polyphenylene ether resin embraces graft copolymers obtained by grafting an aromatic vinyl compound to polyphenylene ether. The polyphenylene ether resin may be either a homopolymer or a copolymer.

Specific examples of the monocyclic phenols represented by formula (I) include, 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol., 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, 2,6-dimethyl-3-propylphenol, etc. Specific examples of the polyphenylene ether resins obtained by polycondensation of one or more of these phenols are poly(2,6-dimethyl-1,4-phenylene)ether, poly(2,6-diethyl-1,4-phenylene)ether, poly(2,6-dipropyl-1,4- phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, a 2,6-dimethylphenol/2,3,6-trimethylphenol copolymer, a 2,6-dimethylphenol/2,3,6-triethylphenol copolymer, 2,6-diethylphenol/2,3,6-trimethylphenol copolymer, a 2,6-dipropylphenol/2,3,6-trimethylphenol copolymer, a graft polymer obtained by grafting styrene to poly(2,6-dimethyl-1,4,-phenylene)ether, a graft copolymer obtained by grafting styrene to a 2,6-dimethylphenol/2,3,6-trimethylphenol copolymer, etc. Preferred among them are poly(2,6-dimethyl1,4-phenylene)ether, and a 2,6-dimethylphenol/2,3,6-trimethylphenol copolymer, a d styrene-grafted polymers thereof.

The intrinsic viscosity of the polyphenylene ether resin to be used is not particularly limited and usually ranges from 0.20 to 0.70 as measured in chloroform at 30° C. From the standpoint of mechanical strength and molding properties (fluidity) of the resulting resin composition, an intrinsic viscosity of from 0.25 to 0.55 is preferred.

The polyester resin which can be used as component (b) is a high-molecular weight thermoplastic resin having an ester linkage in the main chain thereof and includes a polycondensation product obtained from a dicarboxylic acid or its derivative and dihydric alcohol or dihydric phenol compound, a polycondensation product obtained from a dicarboxylic acid or its derivative and a cyclic ether compound, a polycondensation product obtained from a dicarboxylic acid metal salt and a dihalogen compound, a ring opening polymerization product of a cyclic ester compound and the like.

The dicarboxylic acid derivative as above referred to include acid anhydrides, esters and acid chlorides. The dicarboxylic acid includes aromatic dicarboxylic acids and aliphatic dicarboxylic acids. Specific examples of the aromatic dicarboxylic acids are terephthalic acid, isophthalic acid, phthalic acid, chlorophthalic acid, nitrophthalic acid, p-carboxyphenylacetic acid, p-phenylenediacetic acid, m-phenylenediglycolic acid, p-phenylenediglycolic acid, diphenyldiacetic acid, diphenyl-p,p'-dicarboxylic acid, diphenyl-m,m'-dicarboxylic acid, diphenyl-4,4'-diacetic acid, diphenylmethane-p,p'-dicarboxylic acid, diphenylethene-m,m'-dicarboxylic acid, diphenylbutane-p,p'-dicarboxylic acid, benzophenone-4,4'-dicarboxylic acid, naphthalene-1,4-dicarboxylic acid, naphthalene-1,5-dicarboxylic acid, naphthalene-2,6-dicarboxylic acid, naphthalene-2,7-dicarboxylic acid, p-carboxyphenoxyacetic acid, p-carboxyphenoxybutyric acid, 1,2-diphenoxypropane-p,p'-dicarboxylic acid, 1,3-diphenoxypropane-p,p'-dicarboxylic acid, 1,4-diphenoxybutane-p,p'-dicarboxylic acid, 1,5-diphenoxypentane-p,p'-dicarboxylic acid, 1,6-diphenoxypentane-p,p'-dicarboxylic acid, p-(p-carboxyphenoxy)benzoic acid, 1,2-bis(2-methoxyphenoxy)ethane-p,p'-dicarboxylic acid, 1,3-bis(2-methoxyphenoxy)propane-p,p'-dicarboxlic acid, 1,4-bis(2-methoxyphenoxy)butane-p,p'-dicarboxylic acid, 1,5-bis(2-methoxyphenoxy)-3-oxapentane-p,p'-dicarboxylic acid, etc. Specific examples of the aliphatic dicarboxylic acids are oxalic acid, succinic acid, adipic acid, suberic acid, azelaic acid, sebacic acid, dodecanedicarboxylic acid, undecanedicarboxylic acid, maleic acid, fumaric acid, etc. Of these preferred are aromatic dicarboxylic acids, with terephthalic acid, isophthalic acid, and phthalic acid being more preferred.

The dihydric alcohol includes ethylene glycol, propylene glycol, teimethylene glycol, butane-1,3-diol, butane-1,4-diol, 2,2-dimethylpropane-1,3-diol, cis-2-butene-1,4-diol, trans-2-butene-1,4-diol, tetramethylene glycol, pentamethylene glycol, hexamethylene glycol, heptamethylene glycol, octamethylene glycol, decamethylene glycol, etc. Preferred of these are ethylene glycol, propylene glycol, trimethylene glycol, butane-1,4-diol, and butane-1,3-diol, with ethylene glycol and butane-1,4-diol being more preferred. The dihydric phenol compound includes hydroquinone, resorcinol, bisphenol A, etc.

The cyclic ether compound includes ethylene oxide, propylene oxide, etc. The cyclic ester compound includes δ-valerolactone, ε-caprolactone, etc. The dihalogen compound to be reacted with a dicarboxylic acid metal salt is a compound obtained by substituting two hydroxyl groups of the above-recited dihydric alcohol or dihydric phenol compound with a halogen atom, e.g., chlorine, bromine, etc.

The polyester resin to be used as component (b) can be prepared from the above-described starting materials in a known manner, for example, by the processes disclosed in Japanese Patent Publication Nos. 13998/58 and 2594/59.

The molecular weight of the polyester resin is not particularly limited and, in general, the polyester resin has an intrinsic viscosity of from 0.3 to 2.5, and preferably from 0.5 to 1.5, as measured in a 1:1 (by weight) mixed solvent of phenol and tetrachloroethane at 30° C.

The polyester resin as component (b) is present in an amount of from 10 to 95% by weight, preferably from 20 to 90% by weight, more preferably from 30 to 85% by weight, and most preferably from 35 to 85% by weight, based on the total amount of the components (a) and (b).

The epoxidized liquid polybutadiene which can be used as component (c) in the present invention can be obtained by adding an oxygen atom to an ethylene linkage of liquid polybutadiene.

The term "oxirane oxygen" means an oxygen atom bonded to an ethylene linkage, and the term "oxirane oxygen content" means a weight percent of the oxirane oxygen in epoxidized liquid polybutadiene.

A ratio of the double bond structures in the epoxidized liquid polybutadiene, i.e., a ratio of a vinyl group, a trans-1,4 structure, and a cis-1,4 structure, is not limited.

The epoxidized liquid polybutadiene can be prepared by any known processes, for example, a process comprising reacting liquid polybutadiene with hydrogen peroxide, etc. thereby to introduce an oxygen atom into the ethylene linkage of the liquid polybutadiene.

The component (c) should have an oxirane oxygen content of at least 0.07% by weight, preferably from 0.07 to 20% by weight, and more preferably from 1 to 15% by weight, and preferably has a molecular weight ranging from 500 to 10,000 and more preferably from 700 to 5,000. If the oxirane oxygen content is less than 0.07% by weight, desired effects to improve dispersibility (compatibility) of the polyphenylen ether resin and the polyester resin and to prevent phase separation cannot be attained. If it exceeds 20% by weight, the effect to improve dispersibility tends to be reduced.

The epoxidized liquid polybutadiene is present in an amount of from 0.1 to 10 parts by weight, and preferably from 0.5 to 5 parts by weight, per 100 parts by weight of the total amount of the polyphenylene ether resin and the polyester resin. If the proportion of the component (c) is less than 0.1 part by weight, the effects to improve dispersibility and to prevent phase separation are insufficient. On the other hand, if it exceeds 10 parts by weight, such effects become saturated, resulting in bad economy.

In addition to the above-described essential components, the resin composition of the present invention may further contain, if desired, a nucleating agent for the polyester resin, such as talc, mica, titanium oxide, carbon black, etc., or a nucleation accerelator, such as polyalkylene glycols, polyhydric alcohols, higher fatty acid esters, higher fatty acid metal salts, polymers containing a metal carboxylate group, and the like. Further, various additives may also be compounded into the resin composition as far as the effects of the present invention should not be impaired. Such compounding additives include antioxidants, ultraviolet absorbents, plasticizers, slip agents, flame retarders, flame retardation aids, antistatics, conductivity-imparting agents, colorants, polyfunctional crosslinking agents, fibrous reinforcements, e.g., glass fiber, etc., various fillers, e.g., talc, mica titanium oxide, wollastonite, etc., impact resistance-improving agents, e.g., rubbers, etc., and the like.

The resin composition of the present invention can be obtained by melt-kneading the aforesaid components according to any known method. For example, melt-kneading can be carried out by the use of an extruder, a roll mill, a Banbury mixer, a plastomill, etc.

The present invention is now illustrated in greater detail with reference to Examples and Comparative Examples. In these examples, all the parts, percents, and ratios are by weight unless otherwise indicated.

EXAMPLES 1 TO 3

Poly(2,6-dimethyl-1,4-phenylene)ether having an intrinsic viscosity of 0.52 as measured in chloroform at 30° C. (prepared by Mitsubishi Petrochemical Co., Ltd.), a polyethylene terephthalate resin having an intrinsic viscosity of 0.55 as measured in a 1:1 mixed solvent of phenol and tetrachloroethane at 30° C ("KURAPET" produced by Kuraray to., Ltd.), and epoxidized liquid polybutadiene having an oxirane oxygen content of 7.5% and a molecular weight of about 1,000 ("BF1000" produced by Adeka Argus Chemical Co., Ltd.) were uniformly mixed at ratios shown in Table 1, and the mixture was melt-kneaded in a twin-screw extruder having a diameter of 30 mm ("PCM-30 mmφ" manufactured by Ikegai Iron Works, Ltd.) at a cylinder temerature of 270° C. to obtain pellets.

The resulting pellets were dried in a vented drier at 130° C. for 5 hours and molded in an injection molding machine at a cylinder temperature of 270° C. to prepare 6.4 mm thick test specimens. The specimens were determined for notched Izod impact strength at 23° C. in accordance with ASTM D-256. The results obtained are shown in Table 1.

COMPARATIVE EXAMPLE 1

A resin composition was prepared and evaluated in the same manner as in Example 1, except for using no epoxidized liquid polybutadiene. The results obtained are shown in Table 1.

COMPARATIVE EXAMPLE 2

A resin composition was prepared and evaluated in the same manner as in Example 2, except for replacing the epoxidized liquid polybutadiene as used in Example 2 with liquid polybutadiene ("B-1000" produced by Nippon Soda Co., Ltd.). The results obtained are shown in Table 1.

TABLE 1

|  | Example No. | | | Comparative Example No. | |
|---|---|---|---|---|---|
|  | 1 | 2 | 3 | 1 | 2 |
| Composition (part) | | | | | |
| Polyphenylene ether resin | 40 | 40 | 40 | 40 | 40 |
| Polyethylene terephthalate resin | 60 | 60 | 60 | 60 | 60 |
| Epoxidized liquid polybutadiene | 0.5 | 2.0 | 5.0 | — | — |
| Liquid polybutadiene | — | — | — | —2.0 | |
| Izod impact strength (kg-cm/cm) | 4.1 | 7.5 | 7.0 | 1.5 | 1.7 |

EXAMPLES 4 AND 5

Poly(2,6-dimethyl-1,4-phenylene)ether having an intrinsic viscosity of 0.40 as measured in chloroform at 30° C. (prepared by Mitsubishi Petrochemical Co., Ltd.), the same polyethylene terephthalate resin a used in Example 1, epoxidized liquid polybutadiene having an oxirane oxygen content of 6.6% and a molecular weight of 1,800 ("BE-1800" produced by Adeka Argus Chemical Co., Ltd.), and, as impact resistance-improving agent, a styrenebutadiene block copolymer ("TR 2000" produced by Nippon Synthetic Rubber Co., Ltd.) were mixed at ratios shown in Table 2. Each of the resulting resin compositions was evaluated in the same manner as in Example 1, and the results obtained are shown in Table 2.

COMPARATIVE EXAMPLE 3

A resin composition was prepared and evaluated in the same manner as in Example 4, except for using no epoxidized liquid polybutadiene. The results obtained are shown in Table 2.

COMPARATIVE EXAMPLE 4

A resin composition was prepared and evaluated in the same manner as in Example 5, except for using no epoxidised liquid polybutadienne. The results obtained are shown in Table 2.

TABLE 2

|  | Example No. | | Comparative Example No. | |
|---|---|---|---|---|
|  | 4 | 5 | 3 | 4 |
| Composition (part) | | | | |
| Polyphenylene ether resin | 50 | 50 | 50 | 50 |
| Polyethylene terephthalate resin | 50 | 50 | 50 | 50 |
| Epoxidized liquid polybutadiene | 2 | 2 | — | — |
| Styrene-butadiene block copolymer | — | 15 | — | 15 |
| Izod impact strength (kg-cm/cm) | 7.0 | 12.8 | 1.6 | 2.0 |

While the invention has been described in detail and with reference to specific embodiments thereof, it will be apparent to one skilled in the art that various changes and modifications can be made therein without departing from the spirit and scope thereof.

What is claimed is:

1. A polyphenylene ether resin composition consisting essentially of (a) a polyphenylene ether resin, (b) a polyester resin, and (c) from 0.1 to 10 parts by weight, per 100 parts by weight of the total of the components (a) and (b), of an epoxidized liquid polybutadiene having an oxirane oxygen content of at least 0.07% by weight, said polyester resin being present in an amount of from 10 to 95% by weight based on the total amount of the components (a) and (b).

2. A polyphenylene ether resin composition as claimed in claim 1, wherein the polyester resin is present in an amount of from 20 to 90% by weight based on the total amount of the components (a) and (b).

3. A polyphenylene ether resin composition as claimed in claim 1, wherein the polyester resin is present in an amount of from 30 to 85% by weight based on the total amount of the components (a) and (b).

4. A polyphenylene ether resin composition as claimed in claim 1, wherein the polyester resin is present in an amount of from 35 to 80% by weight based on the total amount of the components (a) and (b).

5. A polyphenylene ether resin composition as claimed in claim 1, wherein the epoxidized liquid polybutadiene having an oxirane oxygen atom is present in an amount of from 0.5 to 5 parts by weight per 100 parts by weight of the total of the components (a) and (b).

6. A polyphenylene ether resin composition as claimed in claim 1, wherein the epoxidized liquid polybutadiene has an oxirane oxygen content of from 0.07 to 20% by weight.

7. A polyphenylene ether resin composition as claimed in claim 1, wherein the epoxidized liquid polybutadiene has an oxirane oxygen content of from 1 to 15% by weight.

8. A polyphenylene ether resin composition as claimed in claim 1, wherein the epoxidized liquid polybutadiene has a molecular weight of from 500 to 10,000.

9. A polyphenylene ether resin composition as claimed in claim 1, wherein the epoxidized liquid polybutadiene has a molecular weight of from 700 to 5,000.

10. A polyphenylene ether resin composition as claimed in claim 1, wherein the polyphenylene ether resin has an intrinsic viscosity of from 0.20 to 0.70 as measured in chloroform at 30° C.

11. A polyphenylene ether resin composition as claimed in claim 1, wherein the polyphenylene ether resin has an intrinsic viscosity of from 0.25 to 0.55 as measured in chloroform at 30° C.

* * * * *